United States Patent

[11] 3,589,245

| | | |
|---|---|---|
| [72] | Inventor | Robert F. Boyle<br>Kalamazoo, Mich. |
| [21] | Appl. No. | 882,507 |
| [22] | Filed | Dec. 5, 1969 |
| [45] | Patented | June 29, 1971 |
| [73] | Assignee | Pneumo Dynamics Corporation<br>Cleveland, Ohio |

[54] ACTUATOR POSITION LOCKING MECHANISM
17 Claims, 7 Drawing Figs.

[52] U.S. Cl...................................................... 92/25,
92/27, 74/527, 91/45
[51] Int. Cl............................................................ F15b 15/26
[50] Field of Search........................................ 92/24, 25,
27, 28; 74/527, 533; 91/45

[56] References Cited
UNITED STATES PATENTS
2,764,132   9/1956   Bakke ........................... 92/25
2,592,660   4/1952   Crumley......................... 74/527

Primary Examiner—Martin P. Schwadron
Assistant Examiner—Ronald Lazarus
Attorney—Stephen M. Mihaly ABSTRACT: Actuator position locking mechanism includes a lock piston which is urged in the locking direction by system pressure at a predetermined high level, and in the unlocking direction by such system pressure above such predetermined level, whereby sufficient system pressure is available during both such locking and unlocking movements to counteract external applied forces on the actuator. Projections on the actuator rod have bearings thereon which provide rolling contact with the sides of axial slots in a cylinder or yoke element of the locking mechanism and minimize unlocking forces under load during movement of the rollers from notches in the sides of the slots which receive the rollers for locking the actuator against axial movement.

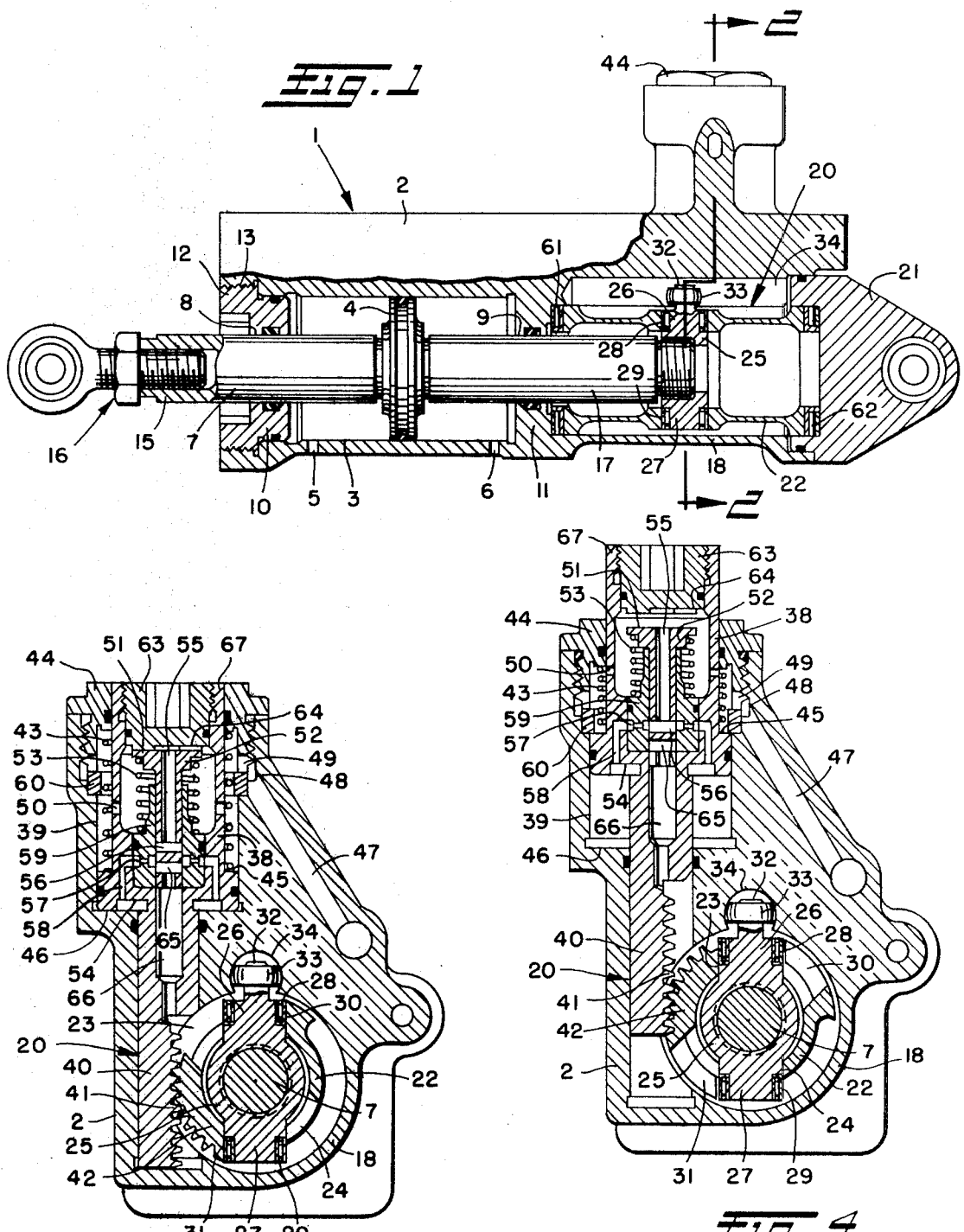

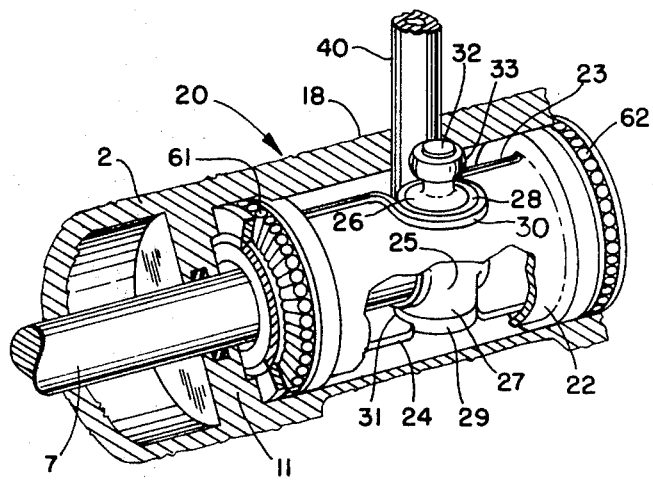
Fig. 3
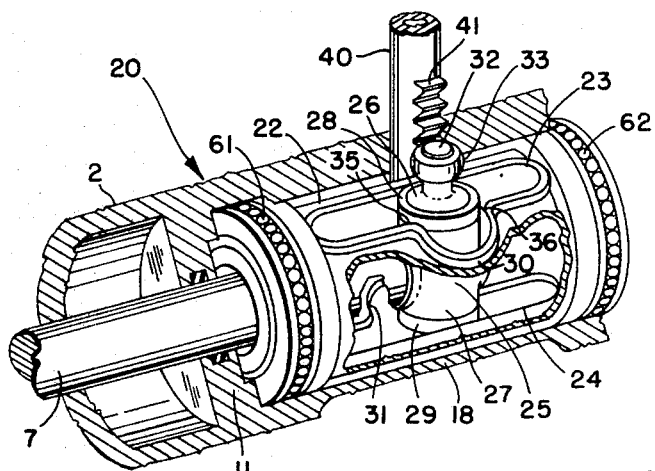
Fig. 5
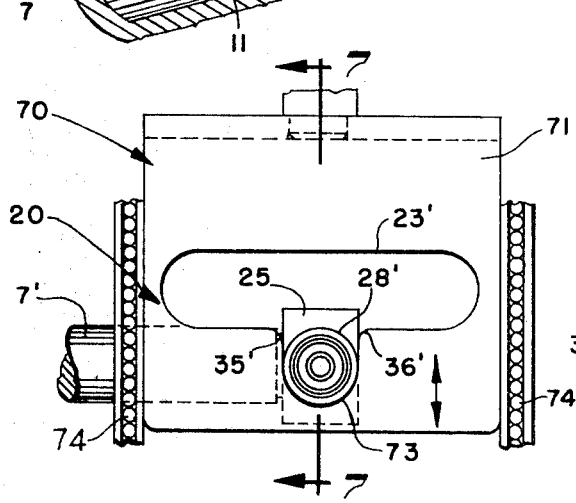
Fig. 6
Fig. 7
INVENTOR
ROBERT F. BOYLE
BY Stephen M. Mihaly
ATTORNEY 3,589,245

ACTUATOR POSITION LOCKING MECHANISM

BACKGROUND OF THE INVENTION

The present invention relates generally as indicated to a locking mechanism for selective locking of a servo actuator against axial movement.

Servo actuators such as are used to control movable load devices are oftentimes subjected to high external forces which have substantially affected the performance of previous known actuator locking mechanisms during both the unlocking and locking cycles. During unlocking, such high external forces resist disengagement of the locking mechanisms from the actuator rod, and after disengagement, tend to overpower the actuator before sufficient servo force can be supplied to overcome such external forces. The same external forces may interfere with the locking sequence by overpowering the servo force available and causing the actuator to move away from the locking position, even when a large bias command is supplied to the servo system. There is also the danger that the locking mechanism will disengage in the event that there is a loss in system pressure, and when the locking mechanism is disengaged, that such a loss in system pressure will result in damage to the locking mechanism or actuator.

SUMMARY OF THE INVENTION

With the foregoing in mind, it is a principal object of this invention to provide a locking mechanism for servo actuators of the type described which is relatively simple in construction and highly reliable.

Another object is to provide such a locking mechanism which is actuated in both the locking and unlocking directions by a relatively high system pressure that also provides a relatively high servo force in opposition to any external loads tending to urge the actuator away from the locking position.

Still another object is to provide such a locking mechanism which is readily disengageable even under load.

A further object is to provide a locking mechanism of the type described which uniformly distributes the loads acting on the lock element.

Another object is to provide such a locking mechanism which gives a visual indication of the position of the lock.

These and other objects of the present invention are achieved by incorporating in the locking mechanism a lock piston which urges a lock element in the locking direction by system pressure at a predetermined high level, and urges the lock element in the unlocking direction when the system pressure exceeds such predetermined high level, whereby sufficient servo force is available to offset any external forces applied to the actuator during both the locking and unlocking movements thereof. The outer end of the lock piston provides a visual indication of the position of the locking mechanism, and an additional spring force is used to hold the lock piston in the lock position at zero pressure condition.

Projections on the actuator rod have bearings thereon which provide rolling contact with the sides of axial slots in a cylinder or yoke element and minimize unlocking forces under load when the rollers are moved out of notches along the edges of the slots which provide a lock position for the actuator when the rollers are received in the notches.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

BRIEF DESCRIPTION OF THE DRAWINGS

In the annexed drawings:

FIG. 1 is a fragmentary longitudinal section through a preferred form of locking mechanism constructed in accordance with this invention shown operatively connected to a servo actuator, the locking mechanism being shown in the lock position locking the actuator against axial movement;

FIG. 2 is an enlarged transverse section through the locking mechanism of FIG. 1, taken on the plane of the line 2-2 thereof;

FIG. 3 is an enlarged fragmentary isometric view of the locking mechanism of FIGS. 1 and 2, partially broken away to show the various parts thereof;

FIG. 4 is an enlarged fragmentary transverse section of the locking mechanism similar to FIG. 2, except that the locking mechanism is shown in the unlock position;

FIG. 5 is an enlarged fragmentary isometric view of the locking mechanism in such unlock position;

FIG. 6 is an enlarged fragmentary top plan view of a modified form of locking mechanism in accordance with the invention; and FIG. 7 is a longitudinal section through the locking mechanism of FIG. 6, taken on the plane of the line 7-7 thereof.

DESCRIPTION OF THE PREFERRED EMBODIMENTS

In FIG. 1, there is shown a servo actuator 1 comprising a housing 2 in which is contained a cylinder 3 having an actuator piston 4 axially slidable therein upon application of system pressure to one or both ends of the cylinder 3 through ports 5 and 6. An actuator 7 extends from opposite sides of the piston 4 through openings 8 and 9 in the ends walls 10 and 11 of the cylinder 3. The end wall 10 may be formed as by inserting an end cap 12 into a threaded opening 13 in the housing 2 communicating with the cylinder 3, and suitable packings may be used where needed to prevent leakage from the cylinder.

As clearly shown in FIG. 1, the left end 15 of the actuator rod 7 extends outwardly beyond the housing 2 and has an adjustable coupling 16 extending therefrom which may be used for connecting the servo actuator 1 to a support structure, not shown. The opposite or right end 17 of the actuator rod 7 extends into a bore 18 in the actuator housing 2 for connection to a preferred form of locking mechanism 20 in accordance with this invention for use in releasably locking the actuator rod 7 against axial movement as desired, in a manner to be subsequently fully explained. The outer end of the bore 18 may be closed by an attachment block 21 adapted to be connected to a movable part to be adjusted or moved, for example, a flight control surface.

Referring further to FIG. 1 and in addition to FIGS. 2 through 5, the construction of the locking mechanism 20 will now be explained in detail. Such locking mechanism includes a lock element 22 which may be a cylinder mounted for rotation in the bore 18, with a pair of longitudinally extending slots 23 and 24 machined in the lock cylinder 22 diametrically opposite each other. Secured to the right end 17 of the actuator rod 7 is a trunnion-shaped element 25 having diametrically opposite projections 26 and 27 which extend radially outwardly from the actuator rod into the longitudinal slots 23 and 24 in the lock cylinder 22. Mounted on the projections 26 and 27 are bearings 28 and 29 which have rolling contact with the slots 23 and 24. One or more notches 30 and 31 of a size sufficient to receive the trunnion bearings 28 and 29 are provided along opposite sides of the slots 23 and 24 for a purpose which will become apparent hereinafter.

The trunnion-shaped element 25 is retained against rotation by an antirotation pin extension 32 on one of the projections 26 having an antirotation bearing 33 thereon received in a longitudinal groove 34 in the wall of the bore 18, thus permitting rotation of the lock cylinder 22 from a "lock" position in which the trunnion bearings 28 and 29 are received in the notches 30 and 31 as shown in FIGS. 1 and 3 for retaining the actuator rod 7 against axial movement, and an "unlock" position in which the trunnion bearings 28 and 29 are in axial alignment with the slots 23 and 24 to permit free travel of the bearings 28 and 29 in the slots by application of predominant system pressure to one or the other end of the actuator cylinder 3. The position of the lock notches 30 and 31, which have a radius matching the radius of the trunnion bearings 28 and 29 and edges 35 and 36 of rounded contour, may be varied as desired to vary the absolute lock position for the servo actuator.

Rotation of the lock cylinder 22 is achieved by movement of a shuttle valve actuated lock piston 38 contained in a chamber 39 in the housing 2, which lock piston has a lock actuator rod 40 extending therefrom with a rack 41 on the outer end thereof engaging a pinion 42 on the lock cylinder 22 (see FIGS. 2 and 4). A spring 43 interposed between an end cap 44 having threaded engagement in the outer end of the chamber 39 and a rearwardly facing shoulder 45 on the lock piston 38 urges the lock piston into engagement with a stop shoulder 46 at the inner end of the chamber 39 under zero pressure conditions for retaining the lock cylinder 22 in the "lock" position with the trunnion bearings 28 and 29 retained against axial movement within the lock notches 30 and 31 as shown in FIGS. 1 through 3. An additional force urging the lock piston 38 in the lock direction is provided by the servosystem pressure which is ported to the spring side of the lock piston 38 through a passage 47 and annular groove 48 in the housing 2 and radial apertures 49 in the inner end of the end cap 44. The servosystem pressure effectively only acts on the outwardly facing shoulder 45 of the lock piston 38 for maintaining the lock cylinder 22 in the lock position until the servosystem pressure reaches a predetermined high level, for example, 850 p.s.i. Above this pressure level the servo system pressure, which is ported to the interior of the lock piston 38 through radial ports 50 therein where it acts on the outer end 51 of a shuttle valve 52 contained therein, is of sufficient magnitude to urge the shuttle valve 52 inwardly as shown in FIG. 4 against the bias of a spring 53. Inward movement of the shuttle valve 52 vents the servosystem pressure to the opposite large area side 54 of the lock piston 38 via longitudinal and transverse passages 55 and 56 in the shuttle valve 52 and aligned passages 57 and 58 in the valve guide sleeve 59 and lock piston 38, thus causing the lock piston 38 to move outwardly and rotate the lock cylinder 22 from the lock to the unlock position as shown in FIGS. 4 and 5. Outward movement of the lock piston 38 is limited by a stop sleeve 60 when engaged by the outwardly facing shoulder 45 on the lock piston. The stop sleeve 60 is held in place by the cylinder cap 44 as shown.

Because the actuator rod 7 is retained in the lock position until a relatively high servosystem pressure is supplied to move the lock piston 38 in the unlock direction as aforesaid. there is sufficient build up of pressure within the actuator cylinder 3 unlocking of the actuator to overcome the high external forces which may be acting on the rod 7. Any axial thrust loads which are applied to the lock cylinder 22 by the actuator rod 7 when in the lock position will not hinder movement of the lock cylinder 22 to the unlock position because of the thrust bearings 61 and 62 at the ends of the lock cylinder and the trunnion bearings 28 and 29 which permit the trunnion-shaped element 25 to roll out of the notches 30 and 31. As the trunnion bearings reach the contoured edges 35 and 36 of the notches, any axial thrust loads acting on the actuator rod will aid in further unlocking of the lock cylinder by camming the lock cylinder in the unlock direction. While in the unlock position, the trunnion bearings 28 and 29 only contact one side of the lock cylinder slots 23 and 24, whereby the tolerance variations on the slot widths may be quite liberal.

When relocking is desired, the servosystem pressure is controlled to move the trunnion-shaped element 25 into alignment with the notches 30 and 31 in the lock cylinder 22 and then lowered somewhat to permit the spring 53 bias to return the shuttle valve 52 to the outward position shown in FIG. 2 where it is maintained in slightly spaced relation from the inner end of the piston plug 63 by spaced-apart ribs 64 thereon. In this latter position, the transverse passage 56 in the shuttle valve 52 is moved out of alignment with the passages 57 and 58 in the guide sleeve 59 and lock piston 38, thereby blocking the flow of high system pressure to the large area side 54 of the lock piston, and an additional passage 65 in the inner end of the shuttle valve 52 communicates with such passages 57 and 58 for permitting escape of the pressure acting on the large area side 54 of the lock piston 38 through a longitudinal opening 66 in the outer end of the lock actuator rod 40 which communicates with the low pressure bore 18 in the housing 2. Accordingly, the predominant servosystem pressure acting on the shoulder 45 of the lock piston 38 and the force of spring 43 will now move the lock piston 38 inwardly and cause reverse rotation of the lock cylinder 22 until the trunnion bearings 28 and 29 are engaged in the notches 30 and 31 for locking the actuator rod 7 against axial movement. Because the shuttle valve 52 has a relatively low hysteresis, the locking mechanism 20 will reengage at a relatively high system pressure, thus greatly facilitating the use of a closed loop position control during the locking sequence, since a higher force level can be realized from the servo actuator 1 for overcoming external loads tending to move the actuator away from its locking position. If too low a pressure level were selected for relocking, the external forces on the actuator would overpower the servo force available and cause the actuator to move away from the locking position before locking, even when a large bias command is fed into the servosystem.

As apparent from FIGS. 1 and 2 when the lock piston 38 is in the lock position, the outer end 67 of the lock piston is flush with the end cap 44, whereas the lock piston is in the unlock position as shown in FIG. 4, such outer end projects outwardly beyond the end cap. Accordingly, since the lock piston 38 is relatively fast and positive in operation and has only two positions, the extent of projection of the outer end of the lock piston provides a visual indication of what position the locking mechanism is in.

Despite the relatively high system pressures which maintain the locking mechanism 20 in both the lock and unlock positions, all of the forces exerted thereby on the lock pistons 38 are not transmitted to the antirotation pin 32 because of the stop surfaces 46 and 60 which limit movements of the lock piston in both the lock and unlock directions. The antirotation pin 32 only has to absorb the transient friction torque loads which are produced as the locking mechanism is unlocking and the torque loads which will be imparted to the trunnion bearings 28 and 29 by the sides of the lock cylinder slots 22 and 23 at those feedback positions out of the locking range when the servosystem pressure drops below the unlock condition. Thus, if system pressure is lost when the actuator is in any position other than the lock position, no damage will occur to the locking mechanism or actuator, since the trunnion bearings 28 and 29 will merely ride in the straight portion of the lock cylinder slots 22 and 23 and the torque which is transmitted to the antirotation pin 32 by the lock cylinder will be quite low Moreover, any loads which are transmitted to the actuator rod 7 by the lock cylinder are distributed equally to opposite ends of the trunnion-shaped element 25.

In FIGS. 6 and 7 there is shown a modified form of locking mechanism 20 in which the lock cylinder 22 has been replaced by a locking yoke or slide 70 including a pair of spaced-apart parallel flat arms 71 and 72 having aligned slots 23' and 24' therein which receive the trunnion bearings 28' and 29' as before and permit free travel of the trunnion bearings along the slots for unobstructed movement of the actuating rod 7' except when the trunnion bearings are captured in aligned notches 73 in the same sides of the slots. Straight linear motion is required to lock and unlock the locking yoke 70, and bearing tracks 74 are provided on each side of the locking yoke for absorbing axial thrust loads. When the actuator piston 4 is out of the lock position and the servosystem pressure is lost, the sides of the locking yoke slots 23' and 24' will merely exert a transverse force on the trunnion bearings 28' and 29' and antirotation pin 32' with out restricting motion of the actuator rod 7 or damaging the actuator parts, as before. Otherwise, the locking mechanism of FIGS. 6 and 7 may be substantially identical to the locking mechanism previously described, and the same shuttle valve actuated lock piston 38 may be used for effecting the desired straight linear movements of the locking yoke. The same reference numerals followed by a prime symbol are used to designate like parts.

From the foregoing, it will now be apparent that the various forms of actuator position locking mechanisms disclosed herein are of relatively simple construction and highly reliable Moreover, such locking mechanisms can readily be unlocked under load, are not susceptible to damage, and are especially suited for use in closed loop position control systems because the relatively high system pressures at which the locking mechanism unlock and relock can be effectively used to provide a servo force for overcoming external loads tending to move an actuator or other device away from its locking position.

I, therefore, particularly point out and distinctly claim as my invention:

1. A locking mechanism for selectively locking a device against axial movement comprising a lock element having a longitudinal slot therein, a radial projection on said device extending into said longitudinal slot, a notch on one side of said slot of a size sufficient to receive said projection, means for retaining said projection against rotation while permitting axial movement thereof when in alignment with said slot, and fluid pressure responsive means for urging said lock element to a lock position in which said projection is received in said notch for retaining said device against axial movement at pressures up to a predetermined high level, and for urging said lock element to an unlock position in which said projection is in axial alignment with said slot to permit free travel of said projection in said slot at pressures above such predetermined high level.

2. The locking mechanism of claim 1 further comprising a bearing on said projection having rolling contact with said slot.

3. The locking mechanism of claim 2 wherein said notch has a radius corresponding to the radius of said bearing on said projection, and the edges of said notch have rounded contours, whereby axial thrust loads applied to said device during movement of said lock element in the unlock direction will aid in moving said lock element toward the unlock position by forcing said bearing into camming engagement with one of said edges.

4. The locking mechanism of claim 1 further comprising thrust bearings at opposite ends of said lock element for absorbing axial thrust loads applied to said lock element by said device during movement between the lock and unlock positions.

5. The locking mechanism of claim 1 wherein there are two of said projections on said device extending in radially opposite directions, and two aligned slots in said lock element which receive said projections for distributing the load applied by said lock element equally to said device.

6. The locking mechanism of claim 1 wherein said lock element comprises a cylinder which is rotated between the lock and unlock positions.

7. The locking mechanism of claim 1 wherein said lock element comprises a slide mounted for linear movement between the lock and unlock positions.

8. The locking mechanism of claim 1 wherein said lock element is contained in a housing and said means for retaining said projection against rotation while permitting axial movement thereof comprises a pin extension on said projection having an antirotation bearing thereon which is received in a longitudinal groove in said housing.

9. The locking mechanism of claim 1 wherein said fluid pressure responsive means comprises a lock piston operatively connected to said lock element, a housing having a chamber containing said lock piston, said lock piston having opposite sides of unequal areas, a passage in said housing communicating with the smaller area side of said lock piston for application of fluid pressure to said smaller area side urging said lock piston in a direction for moving said lock element to the lock position, and shuttle valve means for communicating such fluid pressure with the larger side of said lock piston when such fluid pressure exceeds such predetermined high level for urging said lock piston in a direction for moving said lock element to the unlock position.

10. The locking mechanism of claim 9 further comprising stop means for limiting the movements of said lock piston in the lock and unlock directions thus to limit the amount of force transmitted from said lock piston to said lock element.

11. The locking mechanism of claim 9 wherein the outer end of said lock piston projects outwardly beyond said housing when said lock element is in one of such positions thus to provide a visual indication of the position of said lock element.

12. An actuator comprising a housing containing a cylinder, a piston axially slidably received in said cylinder, a rod projecting from said piston, and a locking mechanism for selectively locking said rod against axial movement, said locking mechanism comprising a lock element having a longitudinal slot therein, a radial projection of said rod extending into said longitudinal slot, a notch on one side of said slot of a size sufficient to receive said projection, means for retaining said projection against rotation while permitting axial movement thereof when in axial alignment with said slot, and means for selectively moving said lock element between a lock position in which said projection is received in said notch for retaining said rod against axial movement and an unlock position in which said projection is in axial alignment with said slot to permit free travel of said projection in said slot.

13. The actuator of claim 12 wherein said lock element is contained within said housing adjacent said cylinder.

14. The actuator of claim 12 further comprising a bearing on said projection having rolling contact with said slot, the edges of said slot having rounded contours, whereby axial thrust loads applied to said rod during movement of said lock element in the unlock direction will aid in moving said lock element toward the unlock position by forcing said bearing into camming engagement with one of said edges.

15. The actuator of claim 12 wherein said lock element comprises a cylinder which is rotated between the lock and unlock positions, and there are thrust bearings at opposite ends of said cylinder for absorbing axial thrust loads applied to said cylinder by said rod during movement between the lock and unlock positions, said rod having two of said projections thereon extending in radial opposite directions, and said cylinder having two of said slots therein in alignment with each other, with notches on opposite sides thereof which receive said projections for distributing loads applied by said cylinder equally to said rod.

16. The actuator of claim 12 wherein said lock element comprises a locking yoke mounted for linear movement between the lock and unlock positions, said locking yoke having a pair of spaced-apart parallel flat arms, aligned slots in said arms, and aligned notches in the same sides of said slots, and there are two of said projections on said rod extending in radial opposite directions which are received in said slots, and bearing tracks on each side of said locking yoke for absorbing axial thrust loads.

17. The actuator of claim 12 wherein said means for moving said lock element between the lock and unlock positions comprises a lock piston operatively connected to said lock element, said lock piston having opposite sides of unequal area, means for supplying system pressure for said actuator to the smaller side of said lock piston for urging said lock piston in a direction for moving said lock element into the lock position, and shuttle valve means for directing such system pressure to the larger area side of said lock piston when such fluid pressure exceeds a predetermined high level for urging said lock piston in a direction for moving said lock element to the unlock position, such high system pressure providing sufficient servo force to said actuator to offset any external forces applied to said actuator during both the locking and unlocking movements of said locking mechanism.